United States Patent
Sugiyama et al.

(10) Patent No.: US 11,162,293 B2
(45) Date of Patent: *Nov. 2, 2021

(54) OPENING AND CLOSING BODY DRIVING MOTOR AND OPENING AND CLOSING BODY DRIVING SYSTEM

(71) Applicant: DENSO CORPORATION, Kariya (JP)

(72) Inventors: Shigeru Sugiyama, Kariya (JP); Hiromichi Ono, Kariya (JP)

(73) Assignee: DENSO CORPORATION, Kariya (JP)

( * ) Notice: Subject to any disclaimer, the term of this patent is extended or adjusted under 35 U.S.C. 154(b) by 216 days.

This patent is subject to a terminal disclaimer.

(21) Appl. No.: 16/471,235

(22) PCT Filed: Feb. 7, 2018

(86) PCT No.: PCT/JP2018/004115
§ 371 (c)(1),
(2) Date: Jun. 19, 2019

(87) PCT Pub. No.: WO2018/155178
PCT Pub. Date: Aug. 30, 2018

(65) Prior Publication Data
US 2020/0199930 A1 Jun. 25, 2020

(30) Foreign Application Priority Data
Feb. 24, 2017 (JP) .............................. JP2017-033600
Oct. 24, 2017 (JP) .............................. JP2017-205471

(51) Int. Cl.
*E05F 15/00* (2015.01)
*E05F 15/695* (2015.01)
(Continued)

(52) U.S. Cl.
CPC ............ *E05F 15/695* (2015.01); *E05F 15/41* (2015.01); *E05Y 2400/36* (2013.01);
(Continued)

(58) Field of Classification Search
CPC ....... E05F 15/41; E05F 15/695; E05F 15/689; E05F 15/60; H02P 7/29; H02P 2201/15;
(Continued)

(56) References Cited

U.S. PATENT DOCUMENTS 5,422,551 A * 6/1995 Takeda .................. H02H 7/0851
318/265
5,774,046 A * 6/1998 Ishihara ..................... B60J 1/17
318/257
(Continued)

FOREIGN PATENT DOCUMENTS

JP H05-168280 A 7/1993
JP H08-277679 A 10/1996
(Continued)

OTHER PUBLICATIONS

Apr. 10, 2018 Search Report issued in International Application No. PCT/JP2018/004115.

*Primary Examiner* — Chi Q Nguyen
(74) *Attorney, Agent, or Firm* — Oliff PLC

(57) ABSTRACT

An open-close body driving motor includes: a motor main body; a driving circuit; and a control circuit that adjusts driving power using PWM control and controls an operation mode of the open-close body to be changeable through the motor main body. The control circuit includes a PWM control unit, and a catch processing unit that determines catching by the open-close body and performs a catch process. When an operation command of the open-close body is created in a state in which a catch prevention function is not operated, the PWM control unit of the control circuit vibrates the motor main body in an audible range, such that the motor main body performs a sound-emitting operation, by including the frequency of the audible range in the control frequency for the PWM control before or during an operation of the open-close body, the operation being based on the operation command.

11 Claims, 5 Drawing Sheets

(51) Int. Cl.
*E05F 15/41* (2015.01)
*H02P 27/08* (2006.01)

(52) U.S. Cl.
CPC ..... *E05Y 2400/564* (2013.01); *E05Y 2900/55* (2013.01); *H02P 27/08* (2013.01)

(58) Field of Classification Search
CPC ............. H02P 21/0089; E05Y 2900/41; E05Y 2900/55; E05Y 2400/564; E05Y 2400/36; B62D 5/0487; B62D 5/0484; F25B 49/025; F25B 49/00
USPC .......... 49/26, 28; 318/455, 433, 62; 180/446
See application file for complete search history.

(56) References Cited

U.S. PATENT DOCUMENTS

| | | | | |
|---|---|---|---|---|
| 8,049,445 B2 * | 11/2011 | Ishihara | ................. | H02P 7/285 318/400.01 |
| 10,883,302 B2 * | 1/2021 | Sugiyama | ................. | H02P 7/05 |
| 2003/0052636 A1 * | 3/2003 | Okada | ................. | E05F 15/41 318/455 |
| 2009/0153090 A1 | 6/2009 | Ishihara et al. | | |
| 2011/0210755 A1 * | 9/2011 | Ogawa | ................. | E05F 15/46 324/686 |
| 2016/0085611 A1 * | 3/2016 | Abe | ................. | G06F 11/0751 714/57 |
| 2019/0337366 A1 * | 11/2019 | Kawaguchi | ............. | E05F 15/41 |
| 2019/0375277 A1 * | 12/2019 | Onitsuka | ................. | B60J 1/17 |
| 2020/0149340 A1 * | 5/2020 | Aoshima | ............... | E05F 15/695 |
| 2020/0284085 A1 * | 9/2020 | Homma | ................. | E05F 15/71 |
| 2020/0291705 A1 * | 9/2020 | Takenaka | ................ | E05F 15/41 |
| 2020/0399946 A1 * | 12/2020 | Brennan | ................. | E05F 15/689 |

FOREIGN PATENT DOCUMENTS

| | | |
|---|---|---|
| JP | H10-066346 A | 3/1998 |
| JP | 2002-002293 A | 1/2002 |
| JP | 2005-336831 A | 12/2005 |
| JP | 2009-171831 A | 7/2009 |
| JP | 2012-211431 A | 11/2012 |

* cited by examiner

OPENING AND CLOSING BODY DRIVING MOTOR AND OPENING AND CLOSING BODY DRIVING SYSTEM

TECHNICAL FIELD

The present disclosure relates to an open-close body driving motor and an open-close body driving system that automatically opens and closes a power window, a sliding roof, a sliding door, or the like.

BACKGROUND ART

An open-close body driving system for a vehicle automatically opens and closes an open-close body, such as a window glass, using a motor. An anti-entrapment function (for example, refer to patent document 1) may be incorporated in such a system so that, for example, when a foreign object is caught between the open-close body and the vehicle body during an automatic closing action, the anti-entrapment function opens the open-close body a predetermined amount (reverse action) to release the caught object. With the anti-entrapment function, there is a need for a control circuit to recognize open and close positions (absolute positions) of the open-close body.

PRIOR ART DOCUMENT

Patent Document

Patent Document 1: Japanese Laid-Open Patent Publication No. 2002-2293

SUMMARY OF THE INVENTION

Problems that the Invention is to Solve

For example, when installing the open-close body driving system in a vehicle, replacing components of the open-close body driving system, or replacing a vehicle battery, if the control circuit does not recognize the open-close position of the open-close body, a technician needs to perform initialization by operating a switch to perform a predetermined action with the open-close body (for example, movement to one of fully open end and fully closed end or movement to both ends) to have the control circuit recognize (stores) the open-close position.

The anti-entrapment function does not become active until the control circuit recognizes the open-close position of the open-close body. Thus, a warning notification is issued to the technician indicating that the anti-entrapment function is not active. However, the issuance of a notification through an in-vehicle speaker, a LED light of a switch member, or the like is troublesome. Further, it is not realistic to prepare a separate notification device only for this purpose.

It is an object of the present disclosure to provide an open-close body driving motor and an open-close body driving system that easily issue a notification indicating that an anti-entrapment function is not active.

Means for Solving the Problems

In one general aspect, an open-close body driving motor includes a motor main body, a drive circuit, and a control circuit. The motor main body automatically opens and closes an open-close body of a vehicle. The drive circuit supplies driving power to the motor main body. The control circuit adjusts the driving power through PWM control and controls an actuation mode of the open-close body with the motor main body in a changeable manner. The control circuit includes a PWM controller and an entrapment processor that determines entrapment caused by the open-close body based on rotation information of the motor main body and performs an entrapment process. The control circuit is configured to enable an anti-entrapment function with the entrapment processor after recognizing an open-close position of the open-close body based on the rotation information of the motor main body. When an actuation instruction of the open-close body is generated under a condition in which the anti-trapping function is inactive, the PWM controller of the control circuit vibrates the motor main body in an audible range by including an audible frequency in a control frequency of the PWM control so that the motor main body performs a sound generation action before or during actuation of the open-close body in correspondence with the actuation instruction.

In another general aspect, an open-close body driving motor includes a motor main body, a drive circuit, and a control circuit. The motor main body automatically opens and closes an open-close body of a vehicle. The drive circuit supplies driving power to the motor main body. The control circuit adjusts the driving power through PWM control and controls an actuation mode of the open-close body with the motor main body in a changeable manner. The control circuit includes a PWM controller and an entrapment processor that determines entrapment caused by the open-close body based on rotation information of the motor main body and performs an entrapment process. The control circuit is configured to enable an anti-entrapment function with the entrapment processor after recognizing an open-close position of the open-close body based on the rotation information of the motor main body. At least during a closing action of the open-close body under a condition in which the anti-trapping function is inactive, the PWM controller of the control circuit drives the motor main body to actuate the open-close body while vibrating the motor main body in an audible range by including an audible frequency in a control frequency of the PWM control so that the motor main body performs a sound generation action.

In another general aspect, an open-close body driving system includes an open-close body driving motor, a drive circuit, and a control circuit. The open-close body driving motor includes a motor main body that automatically opens and closes an open-close body of a vehicle. The drive circuit supplies driving power to the motor main body. The control circuit adjusts the driving power through PWM control and controls an actuation mode of the open-close body with the motor main body in a changeable manner. The control circuit includes a PWM controller and an entrapment processor that determines entrapment caused by the open-close body based on rotation information of the motor main body and performs an entrapment process. The control circuit is configured to enable an anti-entrapment function with the entrapment processor after recognizing an open-close position of the open-close body based on the rotation information of the motor main body. An actuation instruction of the open-close body is generated under a condition in which the anti-trapping function is inactive, the PWM controller of the control circuit vibrates the motor main body in an audible range by including an audible frequency in a control frequency of the PWM control so that the motor main body performs a sound generation action before or during actuation of the open-close body based on the actuation instruction.

In another general aspect, an open-close body driving system includes an open-close body driving motor, a drive circuit, and a control circuit. The open-close body driving motor includes a motor main body that automatically opens and closes an open-close body of a vehicle. The drive circuit supplies driving power to the motor main body. The control circuit adjusts the driving power through PWM control and controls an actuation mode of the open-close body with the motor main body in a changeable manner. The control circuit includes a PWM controller and an entrapment processor that determines entrapment caused by the open-close body based on rotation information of the motor main body and performs an entrapment process. The control circuit is configured to enable an anti-entrapment function with the entrapment processor after recognizing an open-close position of the open-close body based on the rotation information of the motor main body. At least during a closing action of the open-close body under a condition in which the anti-entrapment function is inactive, the PWM controller of the control circuit drives the motor main body to actuate the open-close body while vibrating the motor main body in an audible range by including an audible frequency in a control frequency of the PWM control so that the motor main body performs a sound generation action.

MODES FOR CARRYING OUT THE INVENTION

First Embodiment

A first embodiment of a power window system that serves as an open-close body driving system will now be described.

Figure 1:
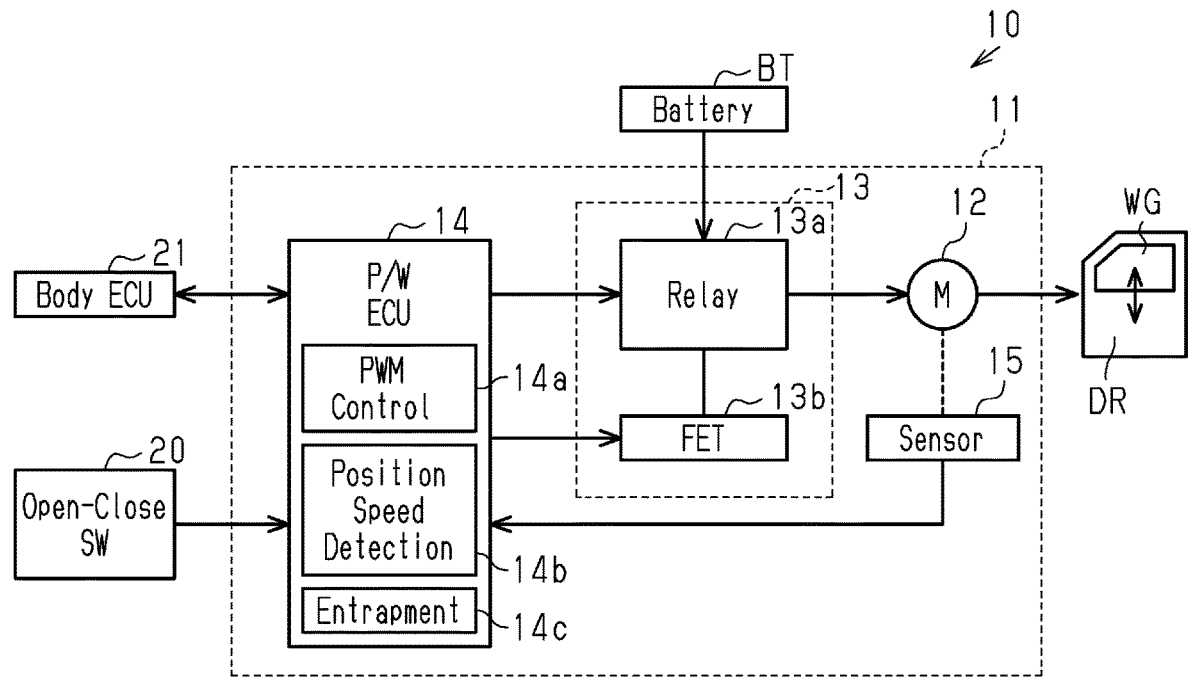
FIG. 1 is a schematic diagram showing the configuration of a system including a power window motor in accordance with a first embodiment.

As shown in FIG. 1, a power window system 10 installed in a vehicle includes a power window motor 11 and a body electric control unit (ECU) 21. The power window motor 11 for automatically opening and closing a window glass WG of a vehicle door DR is coupled to the inside of each door DR. The body ECU 21 is connected to each power window motor 11 of the corresponding door DR in a manner allowing for communication. The window glass WG functions as an open-close body.

The power window motor 11 is formed by integrating a motor main body 12, a drive circuit 13, and a power window ECU (P/W ECU) 14. The power window motor 11 (motor main body 12) functions as an open-close body driving motor. The power window ECU (P/W ECU) 14 functions as a control circuit.

The motor main body 12 is rotated and driven by driving power supplied from the drive circuit 13 to open or close the window glass WG in a vertical direction with a window regulator (not shown).

The drive circuit 13 includes a relay circuit 13a and a field effect transistor (FET) 13b. The relay circuit 13a is a circuit supplied with power from an in-vehicle battery BT and controlling the driving power supplied to the motor main body 12 for forward or reverse rotation driving. Further, the FET 13b, which is a semiconductor switching element, undergoes pulse width modulation (PWM) control and adjusts the driving power output from the relay circuit 13a. More specifically, the relay circuit 13a drives the motor main body 12 to generate forward rotation or reverse rotation or stops driving the motor main body 12. That is, the relay circuit 13a actuates the window glass WG in an opening direction or a closing direction or stops actuating the window glass WG. Further, the FET 13b changes a rotation speed of the motor main body 12, that is, changes a moving speed of the window glass WG. The relay circuit 13a and the FET 13b are controlled by the P/W ECU 14.

The P/W ECU 14 includes a PWM controller 14a, a position speed detector 14b, and an entrapment processor 14c. The P/W ECU 14 performs various controls related to the open-close action of the window glass WG using the PWM controller 14a, the position speed detector 14b, the entrapment processor 14c, and the like. When performing various controls, the P/W ECU 14 receives a rotation pulse signal synchronized with the rotation of the motor main body 12 from a rotation sensor 15. Further, the P/W ECU 14 receives an open or close instruction signal from an open-close switch 20 that is arranged, for example, on the vehicle door DR.

When the open instruction signal is received, the P/W ECU 14 switches the relay circuit 13a to a state allowing power to be supplied to the motor main body 12 (ON) in a power supplying direction that, for example, rotates the motor main body 12 forward. When the close instruction signal is received, the P/W ECU 14 switches the relay circuit 13a to a state allowing power to be supplied to the motor main body 12 (ON) in a power supplying direction that, for example, rotates the motor main body 12 in reverse. Further, in this case, the PWM controller 14a of the P/W ECU 14 outputs a PWM control signal to a control terminal of the FET 13b and switches the FET 13b so that the FET 13b is kept ON (duty 100%) or turned on and off (duty variable) at a predetermined frequency. When the open or close instruction signal is no longer input, the P/W ECU 14 switches off the relay circuit 13a to stop (OFF) supplying power to the motor main body 12. The PWM controller 14a turns the FET 13b off with the PWM control signal.

The position speed detector 14b detects a rotation position of the motor main body 12, that is, a position of the window glass WG, based on a rotation pulse signal synchronized with the rotation of the motor main body 12, specifically, the count of edges of the pulse signal. Information on the position of the window glass WG is stored in a memory of the P/W ECU 14 (not shown) whenever required. In the same manner, the position speed detector 14b detects a rotation speed of the motor main body 12 (moving speed of window glass WG) based on the rotation pulse signal, specifically, length of a cycle of the pulse signal. As the rotation speed of the motor main body 12 decreases, the cycle of the rotation pulse signal becomes longer.

When the rotation speed of the motor main body 12 during a closing action of the window glass WG decreases to a reference speed or less, the entrapment processor 14c determines that a foreign object has been entrapped between the closing window glass WG and the vehicle door DR. In this case, if the moving speed of the window glass WG is changed during the closing action in accordance with, for example, the position of the window glass WG, the reference speed for determining entrapment is also changed accordingly. When it is determined that an entrapment has occurred, the entrapment processor 14, for example, controls the relay circuit 13a and the FET 13b to open the window glass WG a predetermined amount (reverse action) to release the entrapped object. That is, based on the information on the rotation of the motor main body 12, the entrapment processor 14c determines that an entrapment caused by the window glass WG has occurred and performs an entrapment process. The entrapment processor 14c may also determine jamming of a foreign object between the window glass WG and the vehicle door DR during an opening action. In this case, the entrapment processor 14c, for example, controls the relay circuit 13a and the FET 13b to close the window glass WG a predetermined amount to release the jammed object.

The P/W ECU 14 is connected to the body ECU 21, which is a host ECU, in a manner allowing for communication through a vehicle communication system. Examples of the vehicle communication system include local interconnect network (LIN) communication, controller area network (CAN) communication, and the like. The P/W ECU 14 obtains various types of necessary vehicle information from the body ECU 21.

The operation (action) of the power window system 10 will now be described.

Figure 2:
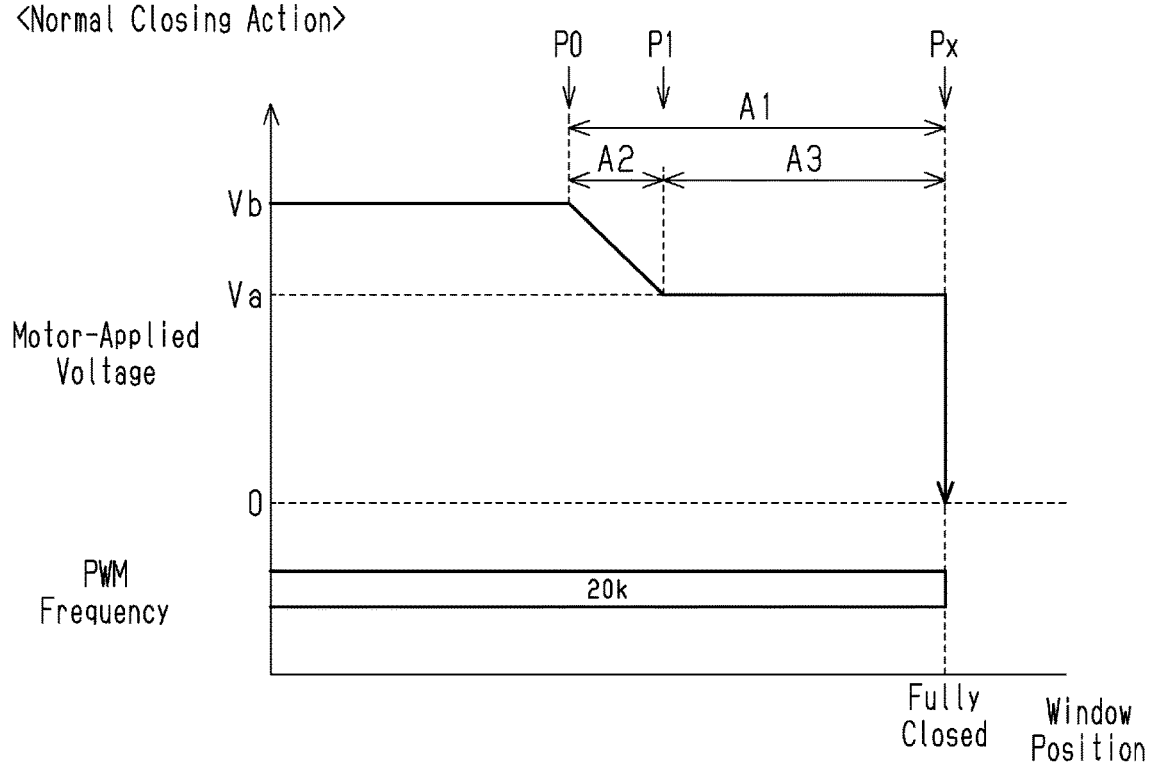
FIG. 2 is a diagram illustrating a normal operation.

While recognizing the position of the window glass WG, the P/W ECU 14 adjusts the driving power (motor-applied voltage) supplied from the drive circuit 13 to the motor main body 12 by PWM-controlling the FET 13b to control the speed of the open-close action of the window glass WG. When closing the window glass WG, as shown in FIG. 2 (position of window glass WG indicated as window position), the P/W ECU 14 performs slow stop control that reduces the speed from a normal speed in a predetermined mode near a fully closed position.

A section corresponding to approximately one-third of the entire process of the open-close action of the window glass WG including a fully closed position Px is set to a slow stop section A1. The slow stop section A1 is a section from a slow start position P0, at which slow stop is started, to the fully closed position Px. Further, in the slow stop section A1, a predetermined position close to the slow start position P0 (position at about one-fourth of slow stop section A1) is set as a first position P1.

The window glass WG is closed at a normal speed before the slow stop section A1. When the window glass WG reaches the slow start position P0 and enters a deceleration section A2, the moving speed of the window glass WG is gradually reduced from the normal speed to a predetermined low speed until the first position P1 is reached. When the window glass WG reaches the first position P1 and enters a low speed constant section A3, the moving speed of the window glass WG is kept constant at the predetermined low speed until the fully closed position Px is reached.

When performing the speed control in the above mode, the PWM controller 14a keeps the FET 13b on (duty 100%) to close the window glass WG at the normal speed before the slow stop section A1. That is, the PWM controller 14a sets the motor-applied voltage of the motor main body 12 to a battery voltage Vb (about 12 V). Even when the FET 13b is kept on (duty 100%), a control frequency of the PWM control is set to approximately 20 kHz Subsequently, when the moving speed of the window glass WG is set to a speed that is lower than the normal speed in the slow stop section A1, the PWM controller 14a adjusts and decreases the duty from 100% and turns the FET 13b on and off. In the deceleration section A2, which is from the slow start position P0 to the first position P1, the PWM controller 14a gradually lowers the duty from 100% to a % (for example, 50%). That is, the PWM controller 14a controls and gradually lowers the motor-applied voltage from the battery voltage Vb (about 12 V) to a low-speed driving voltage Va (for example, 6 V). In the low speed constant section A3, which is from the first position P1 to the fully closed position Px, the PWM controller 14a fixes the duty at α%. That is, the PWM controller 14a controls the motor-applied voltage to be constant at the low-speed driving voltage Va (for example, 6 V).

In the section close to the fully closed position defined as the slow stop section A1 and including the fully closed position Px of the window glass WG, the fully closed position Px corresponds to a mechanical lock position. The impact produced when mechanically locking the window glass WG at the fully closed position Px is reduced by ending closing at a speed lower than the normal speed. In addition, when the window glass WG is closing, a foreign object may be entrapped between the vehicle door DR and the window glass WG. The slow stop section A1, which is provided to close the window glass WG at a low speed, reduces situations in which a foreign object is entrapped.

The open-close action during a normal situation in which the anti-entrapment function is active is performed under the assumption that the P/W ECU 14 recognizes the open-close position of the window glass WG. A technician needs to perform initialization by operating the open-close switch 20 and performing a predetermined action with the window glass WG to have the P/W ECU 14 recognize the open-close position of the window glass WG.

The initialization is performed when the P/W ECU 14 is not recognizing the open and close positions of the window glass WG such as when installing the power window motor 11 and a window regulator in a vehicle, replacing components including the power window motor 11 and the window regulator, and replacing the vehicle battery BT. As one example of the initialization, a technician operates the open-close switch 20 to move the window glass WG to the fully open position and then to the fully closed position. During this actuation, the P/W ECU 14 detects a lock current of the motor main body 12 at the fully closed position and fully open position to recognize the fully closed position and fully open position of the window glass WG (absolute positions), respectively. In this manner, the anti-entrapment function of the P/W ECU 14 (entrapment processor 14c) becomes active.

In other words, the anti-entrapment function is not active when the window glass WG is actuated during the initialization. Thus, it is preferable that a warning notification be issued to the technician indicating that the anti-entrapment function is not active during initialization.

Figure 3:
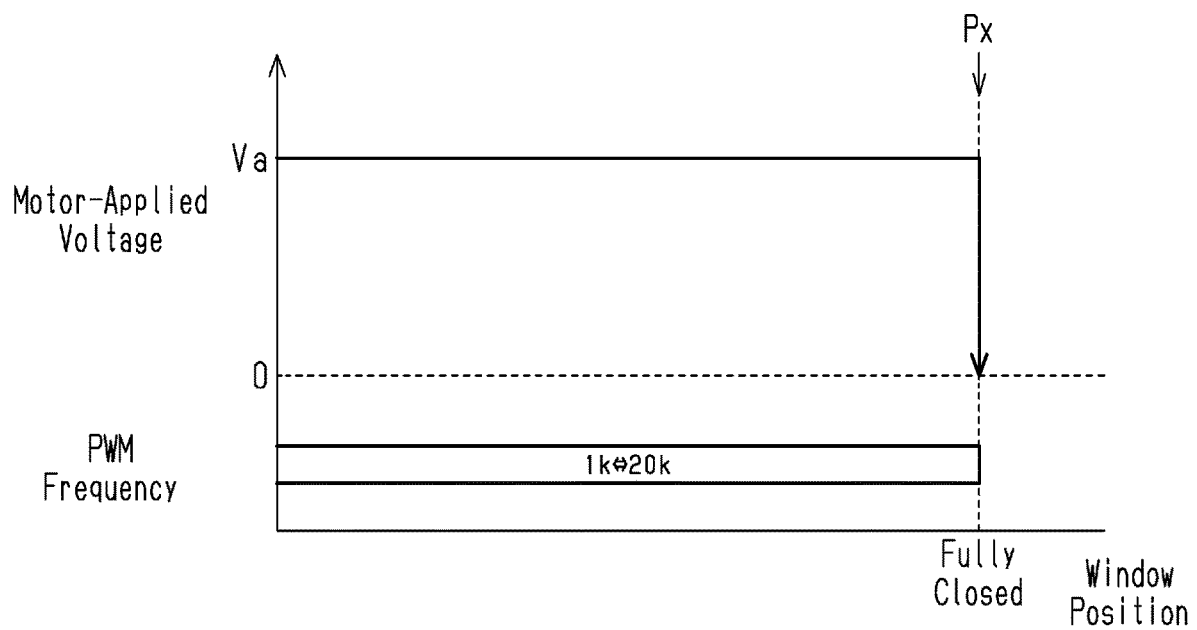
FIG. 3 is a diagram illustrating an operation for performing initialization.

In the present embodiment, as shown in FIG. 3 (showing only closing action of window glass WG), when the predetermined action is performed on the window glass WG for initialization, the P/W ECU 14 (PWM controller 14a) fixes the PWM control duty of the FET 13b, for example, at α% and controls the motor-applied voltage at a constant value, that is, the low-speed driving voltage Va (e.g., 6 V). Further, in this case, the P/W ECU 14 (PWM controller 14a) repeatedly switches the control frequency between, for example, 20 kHz and 1 kHz in predetermined time intervals. For instance, periods of 50 milliseconds for 1 kHz and periods of 150 milliseconds for 20 kHz is are alternately repeated.

More specifically, vibration having a frequency corresponding to each control frequency is generated at the power window motor 11 (motor main body 12). Thus, sound in the human audible range is generated during periods in which the control frequency is 1 kHz, and sound is not generated in the human audible range during the periods in which the control frequency is 20 kHz. In this manner, the motor main body 12 generates sound whenever in the period in which the control frequency is 1 kHz. Thus, this repetition of the sound generation produces a warning notification issued to the technician and the like. As described above, in the present embodiment, the power window motor 11 (the motor main body 12) generates sound by itself and facilitates notification issued to a technician or the like.

The advantages of the present embodiment will now be described.

(1) Under a condition in which the anti-entrapment function is inactive, during the open-close action of the window glass WG, the control frequency of the PWM control performed on the motor main body 12 includes an audible frequency (for example, 1 kHz). Accordingly, during an open-close action of the window glass WG under a condition in which the anti-trapping function is not active, the motor main body 12 is driven to actuate the window glass WG and vibrate the motor main body 12 to generate sound in the audible range. That is, for example, when a technician operates the open-close switch 20 and performs a predetermined action (initialization) on the window glass WG to enable the anti-entrapment function, the motor main body 12 generates sound. More specifically, the motor main body 12 generates sound, for example, during a closing action of the window glass WG, which is when a foreign object may be entrapped between the window glass WG and the vehicle door DR. Accordingly, a notification is easily issued to the technician and the like. That is, the sound generation action of the motor main body easily issues a notification indicating that the anti-trapping function is inactive.

(2) Under a condition in which the anti-trapping function is not active, the motor main body 12 is vibrated in the audible range so that the motor main body produces sound during both closing and opening actions of the window glass WG. This further ensures the issuance of a notification for a technician and the like.

(3) The motor main body 12 repeatedly generates sound during a sound generation action. This further ensures the issuance of a notification for a technician and the like.

Second Embodiment

A second embodiment of the power window system that serves as an open-close body driving system will now be described.

Figure 4:
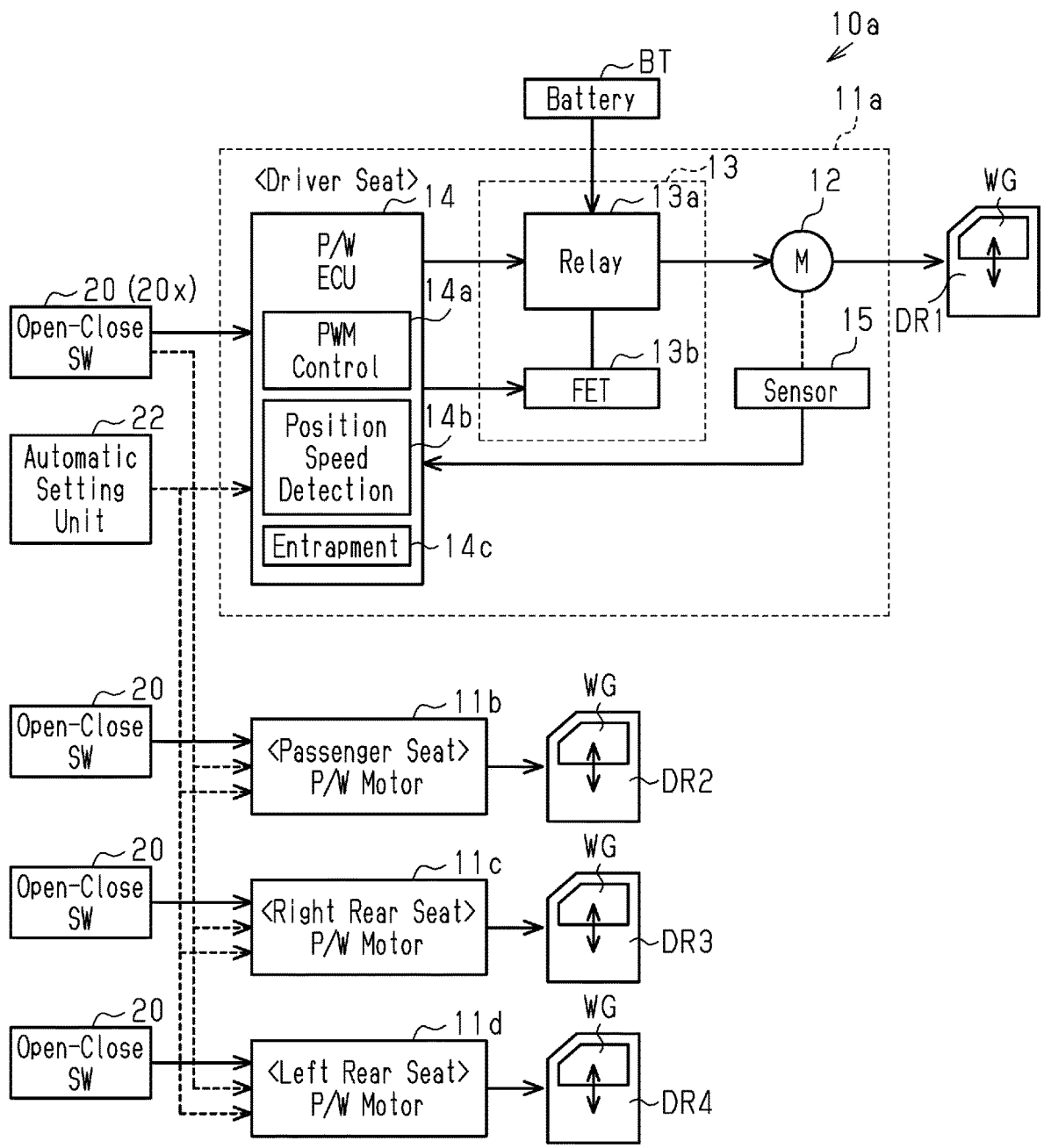
FIG. 4 is a schematic diagram showing the configuration of a system including a power window motor in accordance with a second embodiment.

As shown in FIG. 4, the power window system 10a in the present embodiment is a system for a vehicle having four doors DR1 to DR4. The power window system 10a includes a power window motor 11a for automatically opening and closing the window glass WG of a driver seat door DR1, a power window motor 11b for automatically opening and closing the window glass WG of a passenger seat door DR2, a power window motor 11c for automatically opening and closing the window glass WG of a right rear seat door DR3, and a power window motor 11d for automatically opening and closing the window glass WG of a left rear seat door DR4. FIG. 4 illustrates the specific configuration of the power window motor 11a serving as a representative motor. The motors 11a to 11d have the same configuration as the power window motor 11 of the first embodiment and thus will not be described in detail.

An open or close instruction signal is input to the P/W ECU 14 of each of the power window motors 11a to 11d from the open-close switch 20 of the corresponding one of the doors DR1 to DR4. The open-close switch 20 of the driver seat door DR1 is a master open-close switch 20x configured to open and close the window glass WG of each of the other seats such as the passenger seat, the right rear seat, and the left rear seat in addition to the window glass WG of the driver seat. That is, the open-close switch 20 of the driver seat (master open-close switch 20x) is connected in a mode that allows for the output of the open or close instruction signal to the P/W ECU 14 of each of the power window motors 11a to 11d of the other seats.

In FIG. 4, the body ECU 21, which is the host ECU shown in FIG. 1, is omitted for simplicity. Each of the power window motors 11a to 11d is connected to the body ECU 21 in a manner allowing for communication through LIN communication or the like. Further, the power window motors 11a to 11d are connected via the body ECU 21 in a manner allowing for communication with one another.

The operation (action) of the power window system 10a will now be described.

In the same manner as the first embodiment, the initialization of the P/W ECU 14 of each of the power window motors 11a to 11d is performed based on the operation of the open-close switch 20 related to each of the driver seat, the passenger seat, the right rear seat, and the left rear seat, respectively. That is, under a condition in which the anti-entrapment function is inactive before the initialization, for example, when a technician operates the open-close switch 20 to perform the predetermined action with the window glass WG (initialization) and enable the anti-entrapment function, the motor main body 12 of the corresponding one of the power window motors 11a to 11d is driven and the sound generation action is performed to prompt the technician to be cautious.

In addition, the initialization of the P/W ECU 14 of each of the power window motors 11b to 11d related to the other seats (passenger seat, right rear seat, left rear seat) can be performed, for example, from the open-close switch 20 of the driver seat (master open-close switch 20x) by the technician. This allows for remote initialization. When performing the remote initialization, it is difficult for the technician to check from the driver seat for entrapment of a foreign object by the window glass WG of another seat. Thus, in this situation, the motor main body 12 subject to setting generates sound to prompt a person near the window glass WG of the other seat to be cautious.

Figure 5:
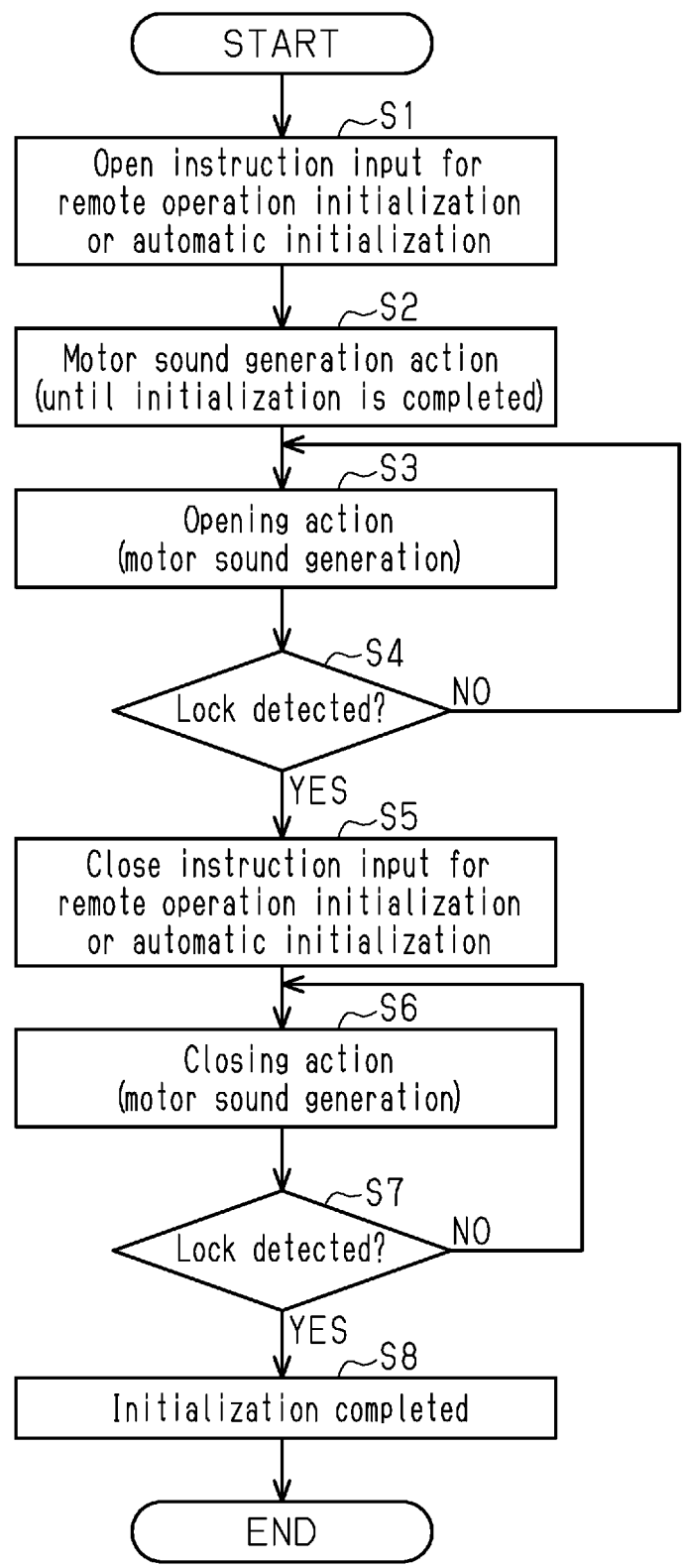
FIG. 5 is a flowchart illustrating an operation for performing initialization of another seat.

FIG. 5 is a flowchart illustrating the remote initialization (includes automatic initialization, which will be described later). As described in the first embodiment, initialization is performed by moving the window glass WG to the fully open position and then to the fully closed position.

When the remote initialization is started, the P/W ECU 14 of the corresponding one of the power window motors 11b to 11d located by a seat subject to initialization receives an open instruction signal from the master open-close switch 20x of the driver seat (step S1). Subsequently, in the same manner as the first embodiment, the P/W ECU 14 drives the motor main body 12 of the initialization subject, performs the sound generation action, and opens the window glass WG (steps S2 and S3). The opening action of the window glass WG is performed until the window glass WG reaches the fully open position and lock detection occurs (step S4).

When the window glass WG reaches the fully open position, the P/W ECU 14 of the initialization subject receives a close instruction signal from the master open-close switch 20x of the driver seat (step S5). In the same manner as the opening action described above, the P/W ECU 14 drives the corresponding motor main body 12, performs the sound generation action, and closes the window glass WG (step S6). The closing action of the window glass WG is performed until the window glass WG reaches the fully closed position and lock detection occurs (step S7). When the window glass WG reaches the fully closed position, the P/W ECU 14 stops driving the motor main body 12 and stops the sound generation action. This completes the initialization (step S8).

Furthermore, the power window system 10a of the present embodiment is configured to perform the initialization automatically near each of the driver seat, the passenger seat, the right rear seat, and the left rear seat. That is, as shown in FIG. 4, in correspondence with the open or close instruction signal from an automatic setting unit 22, the initialization of the P/W ECU 14 of each of the power window motors 11a to 11d illustrated in FIG. 5 is performed sequentially or simultaneously. This prompts a person near the window glass WG subject to initialization to be cautious. The automatic setting unit 22 may be included in the body ECU 21 (refer to FIG. 1), which is a host ECU, or in each P/W ECU 14. Alternatively, the automatic setting unit 22 may be included in an external setting device externally connected to the power window system 10a during the initialization or the like.

Figure 6:
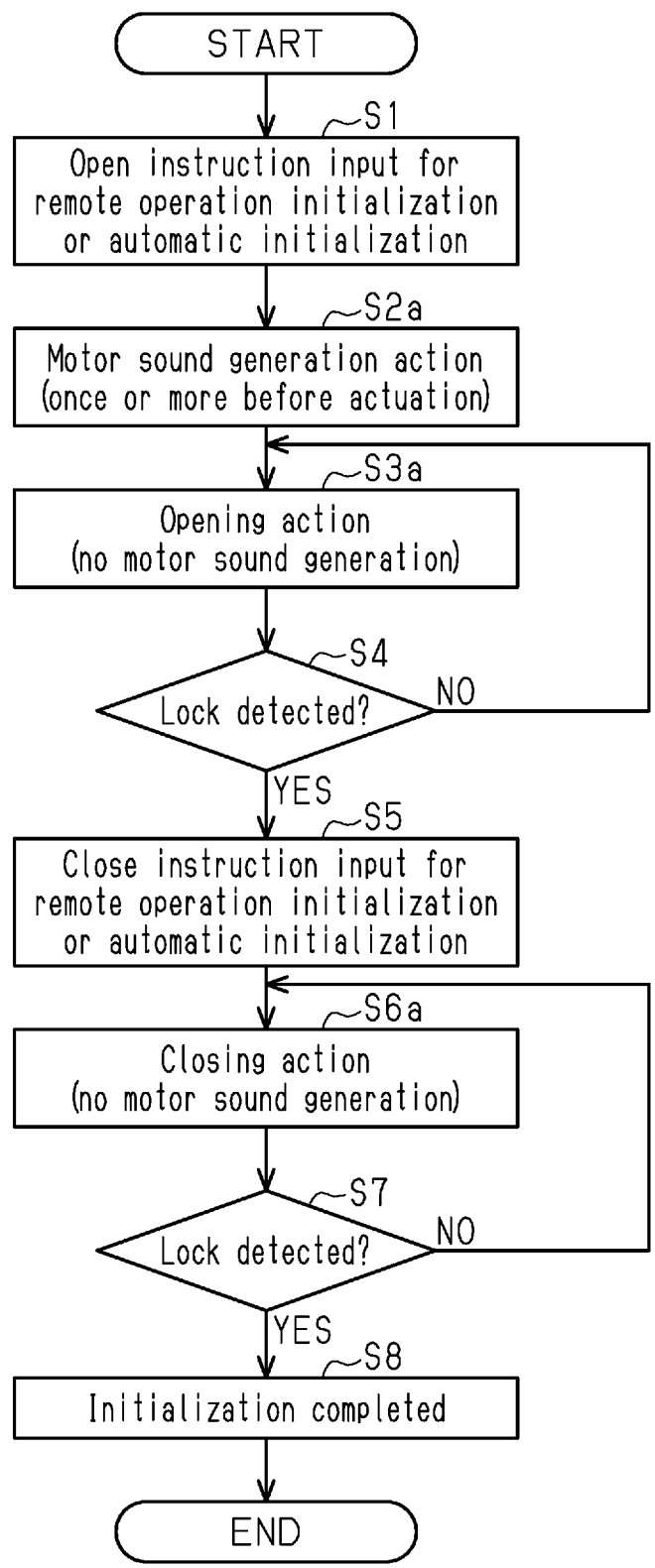
FIG. 6 is a flowchart illustrating an operation for performing initialization of another seat in a modified example.

In a modified example, as illustrated in the flowchart for remote initialization and automatic initialization in FIG. 6, the P/W ECU 14 of each of the power window motors 11a to 11d may be configured to perform the sound generation action with the motor main body 12 only after receiving a start instruction of the initialization (input of open instruction) and before actuating the window glass WG (before driving motor main body 12) (step S2a). In this case, for example, sound is produced once or more (control frequency is switched once or more between 1 kHz and 20 kHz). Further, in this case, since only the sound generation action of the motor main body 12 is performed, the voltage applied to the motor main body 12 is set to a low voltage so that the window glass WG does not move.

Subsequent to the sound generation action, the window glass WG is actuated. In the modified example of FIG. 6, the motor main body 12 is driven without generating sound (control frequency is set to be constant at 20 kHz). In this modified example, a person near the window glass WG is prompted to be cautious. The sound generation action of the motor main body 12 may also be performed before a closing action of the window glass WG.

The advantages of the second embodiment will now be described.

(1) The second embodiment has the same advantages as advantages (1) to (3) of the first embodiment. More specifically, in the present embodiment, under a condition in which the anti-entrapment function is not active, when an actuation instruction of the window glass WG is generated, the motor main body 12 generates sound in correspondence with the instruction before or during the actuation of the window glass WG thereby easily issuing a notification to the technician and the like.

(2) In the power window system 10a of the second embodiment, in the same manner as the first embodiment, the motor main body 12 generates sound when an actuation instruction of the window glass WG is generated through operation of the master open-close switch 20x under a condition in which the anti-entrapment function is not active. That is, the master open-close switch 20x is configured to operate the window glass WG of each of the door DR2 to DR4 near the other seats located at positions separated from the driver seat door DR1. In this regard, it is significant that a person near the window glass WG, which will be actuated, be prompted to be cautious since it will be difficult for the technician operating the master open-close switch 20x to prompt that person to be cautious.

The first and second embodiments may be modified as described below.

A situation in which the anti-entrapment function is not active is described to include when installing the power window motor 11 and a window regulator in a vehicle, replacing components including the power window motor 11 and a window regulator, and replacing the vehicle battery BT. In addition to the above examples, the anti-entrapment function is disabled under various situations such as when an anomaly occurs in the rotation sensor 15 and the open-close position of the window glass WG cannot be obtained, when the open-close position of the window glass WG is erroneously recognized by the P/W ECU 14, when entrapment occurs immediately after reversing action because of an entrapment (based on assumption that switch 20 is externally operated), during reverse action when a foreign object is jammed between the window glass WG and the vehicle door DR during an opening action, and the like. Thus, when actuating the window glass WG under such situations in which the anti-trapping function is disabled, in the same manner as the above embodiments, the sound generation action is performed with the motor main body 12.

The slow stop control is performed, for example, during a normal closing action of the window glass WG. However, the window glass WG may be actuated in any manner.

In the sound generation mode during the initialization, the control frequency is alternately switched to 1 kHz for 50 milliseconds and to 20 kHz for 150 milliseconds. However, the time may be changed. Further, during the initialization, the control frequency may be fixed at 1 kHz to continuously generate sound.

The values used as the PWM control frequency, the positions P0 and P1, the voltage Va and Vb, and the duty ratio α are examples and may be changed.

The drive circuit 13 and the P/W ECU 14 are integrally arranged in the power window motor 11, but the drive circuit 13 and the P/W ECU 14 may be arranged, for example, in the open-close switch 20 or a door integrated ECU that integrally controls electric components related to the vehicle door DR.

The position information of the window glass WG is obtained from the rotation sensor 15 of the motor main body 12. However, the position information may be obtained, for example, from a current sensor configured to detect a current ripple of the motor main body 12.

The motor main body 12 of the power window motor 11 may be a brushed motor or a brushless motor.

The drive circuit 13 is formed by the relay circuit 13a and the FET 13b. However, for example, a drive circuit of a full-bridge type or a half-bridge type including a semiconductor switching element such as a FET may be used.

The subject that is opened and closed is the window glass WG and the present invention is applied to the power window motor 11 (power window system 10). However, the present invention may be applied to other open-close body driving motors (open-close body driving systems) of a vehicle, for example, a motor (system) that drives a sliding roof or a sliding door.

The invention claimed is:

1. An open-close body driving motor comprising:
a motor main body that automatically opens and closes an open-close body of a vehicle;
a drive circuit that supplies driving power to the motor main body; and
a control circuit that adjusts the driving power through Pulse Width Modulation (PWM) control and controls an actuation mode of the open-close body with the motor main body in a changeable manner, and the control circuit includes a Pulse Width Modulation (PWM) controller and an entrapment processor that determines entrapment caused by the open-close body based on rotation information of the motor main body and performs an entrapment process, wherein:
the control circuit is configured to enable an anti-entrapment function with the entrapment processor after recognizing an open-close position of the open-close body based on the rotation information of the motor main body, and
in response to an actuation instruction of the open-close body being generated when the anti-trapping function is inactive, the PWM controller of the control circuit vibrates the motor main body in an audible range by including an audible frequency in a control frequency of the PWM control so that the motor main body performs a sound generation action before or during actuation of the open-close body in correspondence with the actuation instruction.

2. The open-close body driving motor according to claim 1, wherein the PWM controller repeats switching of the control frequency of the PWM control between the audible range and an inaudible range during the sound generation action.

3. The open-close body driving motor according to claim 1, wherein the open-close body, which is subject to opening and closing by the motor main body, is a window glass of a vehicle door.

4. An open-close body driving system comprising:
the open-close body driving motor according to claim 1, provided for each of a plurality of open-close bodies of the vehicle; and
a master open-close switch that performs an open-close action with any of the plurality of open-close bodies,
wherein in response to an actuation instruction of the open-close body beings generated by operation of the master open-close switch when an anti-entrapment function is inactive, the motor main body performs a sound generation action.

5. An open-close body driving motor comprising
a motor main body that automatically opens and closes an open-close body of a vehicle;
a drive circuit that supplies driving power to the motor main body; and
a control circuit that adjusts the driving power through Pulse Width Modulation (PWM) control and controls an actuation mode of the open-close body with the motor main body in a changeable manner, and the control circuit includes a Pulse Width Modulation (PWM) controller and an entrapment processor that determines entrapment caused by the open-close body based on rotation information of the motor main body and performs an entrapment process, wherein:
the control circuit is configured to enable an anti-entrapment function with the entrapment processor after recognizing an open-close position of the open-close body based on the rotation information of the motor main body, and
at least during a closing action of the open-close body when the anti-trapping function is inactive, the PWM controller of the control circuit drives the motor main body to actuate the open-close body while vibrating the motor main body in an audible range by including an audible frequency in a control frequency of the PWM control so that the motor main body performs a sound generation action.

6. The open-close body driving motor according to claim 5, wherein when the anti-trapping function is inactive, the PWM controller vibrates the motor main body in the audible range so that the motor main body performs the sound generation action during any one of a closing action and an opening action of the open-close body.

7. The open-close body driving motor according to claim 5, wherein the PWM controller repeats switching of the control frequency of the PWM control between the audible range and an inaudible range during the sound generation action.

8. The open-close body driving motor according to claim 5, wherein the open-close body, which is subject to opening and closing by the motor main body, is a window glass of a vehicle door.

9. An open-close body driving system comprising:
the open-close body driving motor according to claim 5 provided for each of a plurality of open-close bodies of the vehicle; and
a master open-close switch that performs an open-close action with any of the plurality of open-close bodies,
wherein in response to an actuation instruction of the open-close body being generated by operation of the master open-close switch when an anti-entrapment function is inactive, the motor main body performs a sound generation action.

10. An open-close body driving system comprising:
an open-close body driving motor including a motor main body that automatically opens and closes an open-close body of a vehicle;
a drive circuit that supplies driving power to the motor main body; and
a control circuit that adjusts the driving power through Pulse Width Modulation (PWM) control and controls an actuation mode of the open-close body with the motor main body in a changeable manner, and the control circuit includes a Pulse Width Modulation (PWM) controller and an entrapment processor that determines entrapment caused by the open-close body based on rotation information of the motor main body and performs an entrapment process, wherein:
the control circuit is configured to enable an anti-entrapment function with the entrapment processor after recognizing an open-close position of the open-close body based on the rotation information of the motor main body, and
in response to an actuation instruction of the open-close body being generated when the anti-entrapment function is inactive, the PWM controller of the control circuit vibrates the motor main body in an audible range by including an audible frequency in a control frequency of the PWM control so that the motor main body performs a sound generation action before or during actuation of the open-close body based on the actuation instruction.

11. An open-close body driving system comprising:
an open-close body driving motor including a motor main body that automatically opens and closes an open-close body of a vehicle;
a drive circuit that supplies driving power to the motor main body; and
a control circuit that adjusts the driving power through Pulse Width Modulation (PWM) control and controls an actuation mode of the open-close body with the motor main body in a changeable manner, and the control circuit includes a Pulse Width Modulation (PWM) controller and an entrapment processor that determines entrapment caused by the open-close body based on rotation information of the motor main body and performs an entrapment process, wherein:
the control circuit is configured to enable an anti-entrapment function with the entrapment processor after recognizing an open-close position of the open-close body based on the rotation information of the motor main body, and
at least during a closing action of the open-close body when the anti-entrapment function is inactive, the PWM controller of the control circuit drives the motor main body to actuate the open-close body while vibrating the motor main body in an audible range by including an audible frequency in a control frequency of the PWM control so that the motor main body performs a sound generation action.

* * * * *